(12) United States Patent
Guo et al.

(10) Patent No.: US 9,261,333 B2
(45) Date of Patent: Feb. 16, 2016

(54) FLAME RETARDANT BALLISTIC LAMINATE

(75) Inventors: Chuanpu Guo, Newark, OH (US); Brian R. Kopan, Granville, OH (US); Josef S. Dobriski, Morgan Hill, CA (US)

(73) Assignee: Tencate Advanced Armor USA, Inc., Newark, OH (US)

( * ) Notice: Subject to any disclaimer, the term of this patent is extended or adjusted under 35 U.S.C. 154(b) by 480 days.

(21) Appl. No.: 13/608,809

(22) Filed: Sep. 10, 2012

(65) Prior Publication Data
US 2014/0322483 A1 Oct. 30, 2014

(51) Int. Cl.
*F41H 5/04* (2006.01)
*B32B 38/00* (2006.01)
(Continued)

(52) U.S. Cl.
CPC ............... *F41H 5/0485* (2013.01); *B32B 5/08* (2013.01); *B32B 5/12* (2013.01); *B32B 5/26* (2013.01); *B32B 15/02* (2013.01); *B32B 38/00* (2013.01); *B32B 2038/0072* (2013.01); *B32B 2262/02* (2013.01); *B32B 2262/0253* (2013.01);
(Continued)

(58) Field of Classification Search
CPC .......... B32B 5/12; B32B 5/028; B32B 15/02; B32B 2338/0072; B32B 2307/3065; B32B 2571/02; B32B 27/00; B32B 27/02; B32B 27/12; B32B 27/32; B32B 27/322; B32B 27/327; B32B 27/34; B32B 38/00; B32B 5/00; B32B 5/22; B32B 5/26; B32B 7/00; B32B 7/02; B32B 7/14; B32B 9/005; B32B 9/007; B32B 9/04; B32B 9/047; F41H 5/0485; F41H 1/4085; Y10T 156/10; Y10T 428/24124; Y10S 428/911; Y10S 428/91; Y10S 428/921
USPC ........ 2/2.5; 442/134, 135; 428/911, 912, 920, 428/921, 98, 102, 105, 108, 110, 112, 113, 428/114, 119
See application file for complete search history.

(56) References Cited

U.S. PATENT DOCUMENTS

| 4,501,856 A | 2/1985 | Harpell et al. |
| 4,613,535 A | 9/1986 | Harpell et al. |

(Continued)

FOREIGN PATENT DOCUMENTS

| EP | 0683374 A1 | 11/1995 |
| EP | 1574811 A1 | 9/2005 |

(Continued)

OTHER PUBLICATIONS

SeamMaster High Profile Ultrasonic Bonder, Sonobond Ultrasonics, 2010.

(Continued)

*Primary Examiner* — Arti Singh-Pandey
(74) *Attorney, Agent, or Firm* — Calfee, Halter & Griswold LLP (57) ABSTRACT

A ballistic laminate includes a layer including first fibers of a first material oriented at both a first direction and a second direction and second fibers of a second material oriented at both the first direction and the second direction. The first fibers are flammable, and the second fibers are flame retardant. A periodic distance greater than about 9 mm is between the second fibers of the second material oriented at the first direction. A periodic distance greater than about 9 mm is between the second fibers of the second material oriented at the second direction.

15 Claims, 5 Drawing Sheets

(51) Int. Cl.
*B32B 5/08* (2006.01)
*B32B 5/12* (2006.01)
*B32B 5/26* (2006.01)
*B32B 15/02* (2006.01)

(52) U.S. Cl.
CPC ... *B32B2262/0269* (2013.01); *B32B 2262/101* (2013.01); *B32B 2262/105* (2013.01); *B32B 2262/106* (2013.01); *B32B 2262/14* (2013.01); *B32B 2307/3065* (2013.01); *B32B 2571/02* (2013.01); *B32B 2605/08* (2013.01); *B32B 2605/18* (2013.01); *Y10T 156/10* (2015.01); *Y10T 428/24124* (2015.01); *Y10T 428/249924* (2015.04); *Y10T 428/249949* (2015.04)

(56) References Cited

U.S. PATENT DOCUMENTS

| | | |
|---|---|---|
| 4,623,574 A | 11/1986 | Harpell et al. |
| 4,650,710 A | 3/1987 | Harpell et al. |
| 4,748,064 A | 5/1988 | Harpell et al. |
| 5,167,876 A | 12/1992 | Lem et al. |
| 5,190,802 A | 3/1993 | Pilato |
| 5,437,905 A | 8/1995 | Park |
| 5,443,882 A | 8/1995 | Park |
| 5,443,883 A | 8/1995 | Park |
| 5,480,706 A | 1/1996 | Li et al. |
| 5,547,536 A | 8/1996 | Park |
| 5,635,288 A | 6/1997 | Park |
| 5,935,678 A | 8/1999 | Park |
| 5,952,078 A | 9/1999 | Park |
| 7,148,162 B2 | 12/2006 | Park et al. |
| 7,288,307 B2 | 10/2007 | Bhatnagar et al. |
| 7,601,654 B2 | 10/2009 | Bhatnagar et al. |
| 7,820,565 B2 * | 10/2010 | van Heerden et al. ........ 442/134 |
| 2004/0086685 A1 | 5/2004 | Brillhart, III et al. |
| 2004/0221712 A1 * | 11/2004 | Stewart et al. ............... 89/36.05 |
| 2005/0153098 A1 | 7/2005 | Bhatnagar et al. |
| 2011/0048220 A1 | 3/2011 | Dickson |
| 2012/0146784 A1 * | 6/2012 | Hines et al. .............. 340/539.11 |

FOREIGN PATENT DOCUMENTS

| | | |
|---|---|---|
| JP | 2004058517 | 2/2004 |
| WO | 2007016382 A2 | 2/2007 |

OTHER PUBLICATIONS

International Search Report for related PCT Patent Application No. PCT/US2013/058504, mailed Jun. 4, 2014.

Written Opinion for related PCT Patent Application No. PCT/US2013/058504, mailed Jun. 4, 2014.

* cited by examiner

FLAME RETARDANT BALLISTIC LAMINATE

BACKGROUND

The present invention relates to a ballistic laminate. It finds particular application in conjunction with a ballistic laminate that offers both ballistic and flame retardant properties and will be described with particular reference thereto. It will be appreciated, however, that the invention is also amenable to other applications.

Ballistic resistant body armor and vehicle armor are made from either woven fabrics or unidirectional fabrics comprising high performance fibers such as ultra-high-molecular-weight-polyethylene (UHMWPE) fibers, aramid fibers, and glass fibers, etc. Unidirectional fiber reinforced composite where fibers are encapsulated in a polymeric matrix materials generally has better ballistic resistance than traditional woven fabrics.

Various unidirectional composite constructions are currently used for formation of soft and hard armors in ballistic protection applications. Some composite constructions use high performance fibers such as UHMWPE fibers in matrix materials. However, some high performance fibers such as UHMWPE fibers are flammable when exposed to fire and heat. There is a growing demand for fire resistance armors.

One conventional composite construction use a layer-by-layer hybrid composite construction (i.e., one or more layers comprising flame resistant fibers and one or more layers comprising flammable fiber to improve the flame resistance of the composite). One multilayer composite design includes one or more first layers of flammable fibers in a matrix and at least one second layer adjacent to the first layer. The second matrix includes a fire retardant material. The second matrix is different than the first matrix.

Another conventional composite construction includes at least one layer of UHMWPE fibers or aramid fibers in a matrix and at least one fire retardant layer. The fire retardant layer includes a fire retardant agent that absorbs heat when exposed to fire and heat in a matrix. The matrix includes one or more relatively high chart yield resins that results in better flame resistant performance.

Another conventional composite construction includes a molded ballistic panel for use in aircraft and land vehicles for structural, ballistic, and fire resistant performance. The molded panel is formed by inserting a honeycomb between panels including non-woven high performance fiber layers and one or more fire resistant fiber layers.

U.S. Pat. No. 7,288,307 to Bhatnagar, et al. discloses hybrid laminated unidirectional fiber sheets produced from continuous roll of unidirectional prepregs, having application for impact absorption, ballistic resistance, and penetration resistance. The laminated unidirectional fiber sheets include two or more types of unidirectional fibers with different composition in a matrix. The two or more types of fibers are arranged in a side by side position. The periodic distance between fibers that have the same composition is not greater than 9 mm. However, neither distinguishes flame resistant fibers compared with flammable fibers nor gives any description on hybrid fiber-by-fiber composite constructions and/or fiber arrangements that improve the flame resistance performance of a composite.

The present invention provides a new and improved apparatus and method which addresses the above-referenced problems.

SUMMARY

In one aspect of the present invention, it is contemplated that a ballistic laminate includes a layer including first fibers of a first material oriented at both a first direction and a second direction and second fibers of a second material oriented at both the first direction and the second direction. The first fibers are flammable, and the second fibers are flame retardant. A periodic distance greater than about 9 mm is between the second fibers of the second material oriented at the first direction. A periodic distance greater than about 9 mm is between the second fibers of the second material oriented at the second direction.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
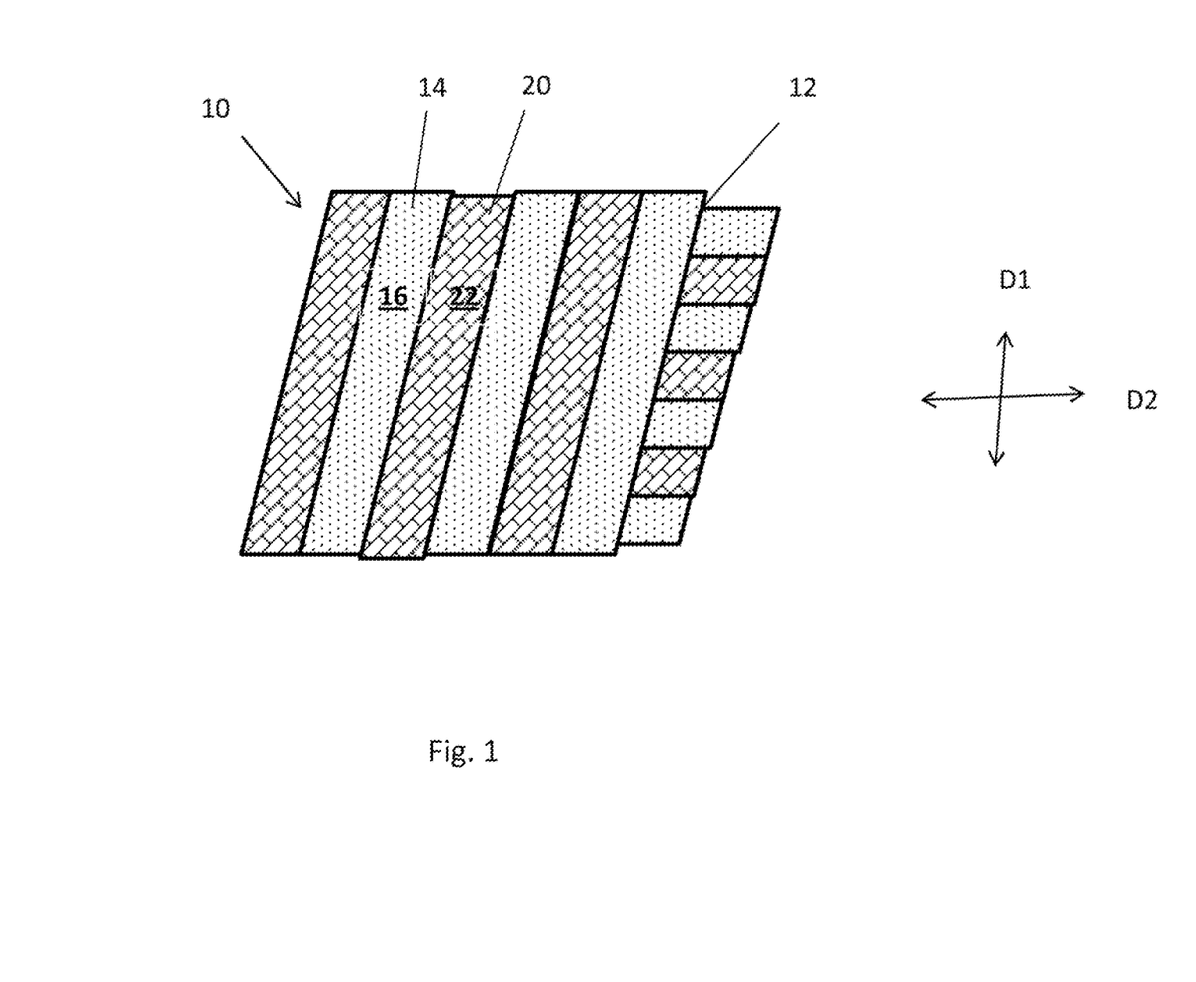
FIG. 1 illustrates a schematic representation of a laminate layer in accordance with one embodiment of an apparatus illustrating principles of the present invention.

With reference to FIG. 1, a top view of a simplified diagram of an exemplary ballistic laminate 10 is illustrated in accordance with one embodiment of the present invention. The laminate 10 includes a first layer 12. The first layer 12 includes first fibers 14 of a first material 16 oriented at both a first direction D1 and a second direction D2. The first layer 12 also includes second fibers 20 of a second material 22 oriented at both the first direction D1 and the second direction D2.

As shown in FIG. 1, the first direction D1 is contemplated to be defined as 0°. The second direction D2 is contemplated to be at as right angle to the first direction D1. Therefore, if the first direction D1 is defined, as 0°, the second direction D2 is defined as 90°. Although the first and second directions D1, D2 are described as 0° and 90°, respectively, it is to be understood that any other orientation system is also contemplated. Also, other embodiments are contemplated in which the first and second directions are not perpendicular to each other.

It is contemplated that the first fibers 14 of the first material 16 are relatively more flammable than the second fibers 20 of the second material 22. In one example, the first fibers 14 of the first material 16 may have a Limiting Oxygen Index (LOI) less than or equal to 25, and the second fibers 20 of the second material 22 may have an LOI greater than 25. LOI is defined as the minimum amount of oxygen required in the mixture of oxygen and nitrogen, expressed as a percentage, to support combustion of fibers. The higher the LOI, the more flame retardant fibers are. Usually, fibers with an LOI higher than 25 are considered to be flame retardant (e.g., resistant), while fibers with an LOI less than or equal to 25 are considered flammable. Therefore, in this embodiment, the first fibers 14 of the first material 16 are flammable, while the second fibers 20 of the second material 22 are flame retardant. In one example, the first fibers 14 of the first material 16 are UHM-WPE in a matrix. However, it is also contemplated that the first fibers 14 of the first material 16 may be polypropylene fibers in a matrix, or any other fiber having an LOI less than or equal to 25.

In one example, the second fibers 20 of the second material 22 are at least one of aramid fibers and liquid crystal polymer (LCP) fibers. However, it is also contemplated that the second fibers 20 of the second material 22 may be at least one of glass fibers, PBO fibers, carbon fibers, ceramic fibers, PTFE fluoropolymer fibers, and steel wires, or any other fiber having an LOI greater than 25.

Figure 2:
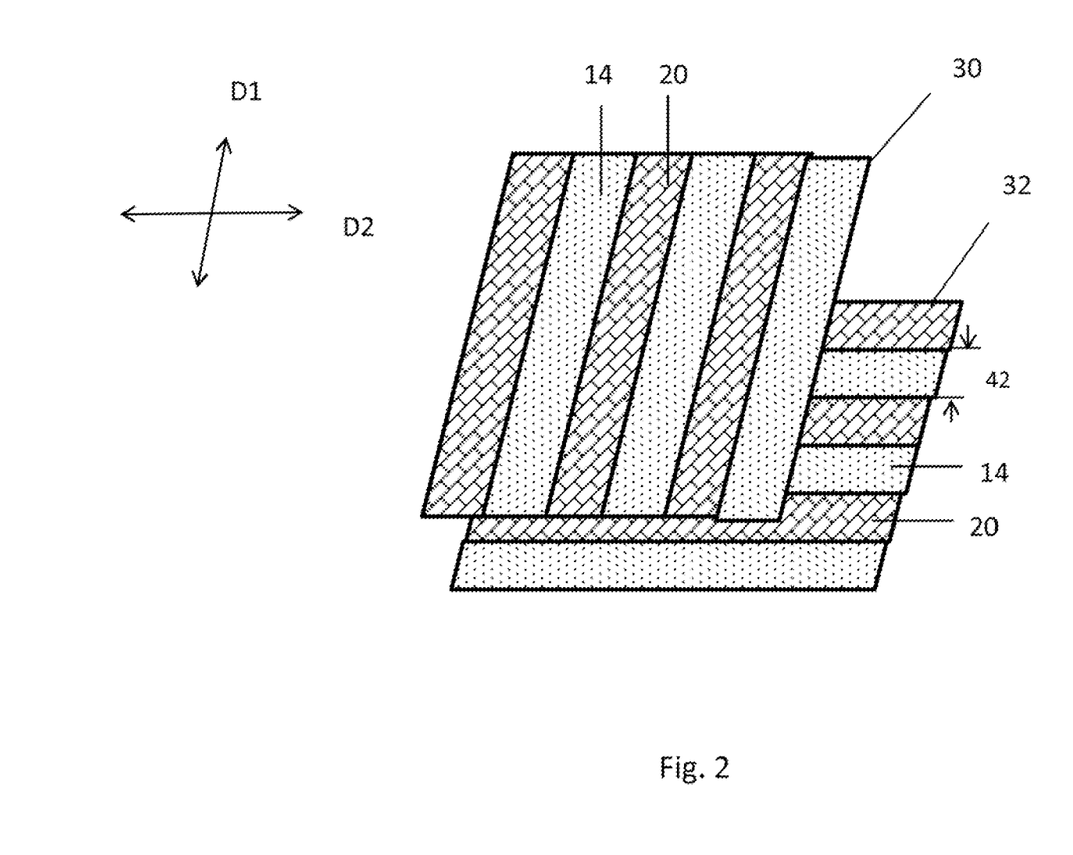
FIG. 2 illustrates a schematic representation of two plies of the laminate layer in accordance with one embodiment of an apparatus illustrating principles of the present invention.

With reference to FIGS. 1 and 2, the first layer 12 includes a plurality of plies. In the illustrated embodiment, the first layer 12 includes two (2) plies, for example a first ply 30 and a second ply 32. The first ply 30 of the first layer 12 includes at least a portion of the first fibers 14 and the second fibers 20 oriented at the first direction D1. The second ply 32 of the first layer 12 includes at least a portion of the first fibers 14 and the second fibers 20 oriented at the second direction D2. The first ply 30 is adjacent to the second ply 32 to form the first layer 12. In one embodiment, it is contemplated that the first ply 30 is attached to the second ply 32 to form the first layer 12. For example, in the embodiment illustrated in FIG. 2, the first ply 30 and the second ply 32 are bonded together in the matrix. Other embodiments, in which the first ply 30 and the second ply 32 are secured together in different ways are also contemplated.

Figure 3:
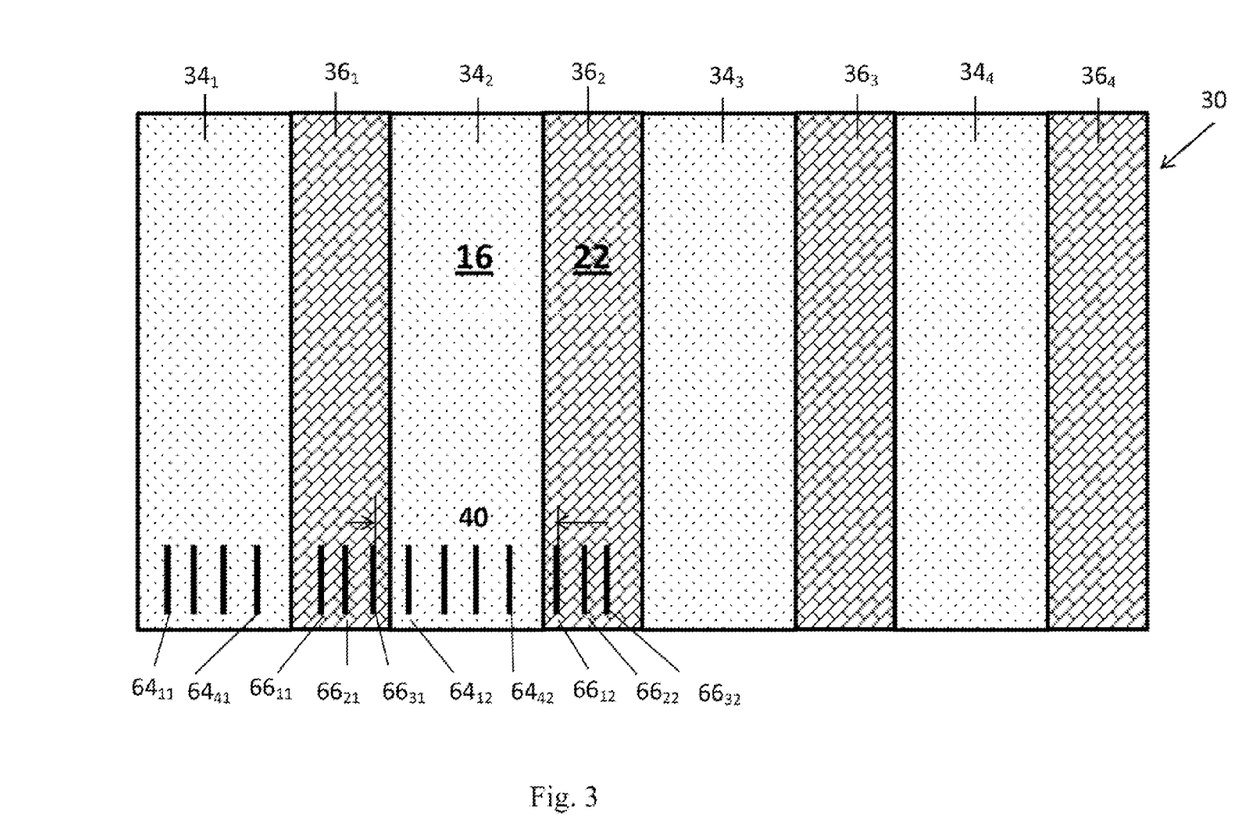
FIG. 3 illustrates a schematic representation of an enlarged portion of a top view of a portion of the first ply.

With reference to FIG. 3, an enlarged portion of a top view of a portion of the first ply 30 is illustrated. The first ply 30 includes at least one (1) first section 34 of the first fibers 14 of the first material 16 and at least one (1) second section 36 of the second fibers 20 of the second material 22. Each of the first sections 34 is adjacent to at least one of the second sections 36. In the illustrated embodiment, the first ply 30 includes alternate sections of the first section 34 and the second section 36.

For ease of illustration, first fiber bundles or fiber tapes $64_{11}$ to $64_{41}$ and $64_{12}$ to $64_{42}$ (collectively 64) (hereinafter the first fiber bundles) including the first unidirectional fibers 14 (see FIGS. 1 and 2) of the first material 16 (see FIGS. 1 and 2) are shown as short, vertical lines in the first section 34, and second fiber bundles or fiber tapes $66_{11}$ to $66_{31}$ and $66_{12}$ to $66_{32}$ (collectively 66) (hereinafter the second fiber bundles) including the second unidirectional fibers 20 (see FIGS. 1 and 2) of the second material 22 (see FIGS. 1 and 2) are illustrated as short, vertical lines in the second section 36. It is to be understood that the first section 34 includes additional fibers bundles of first fibers 14 (see FIGS. 1 and 2) of the first material 16 (see FIGS. 1 and 2) beyond those illustrated in FIG. 3. Additionally, it is to be understood that the second section 36 includes additional fiber bundles of second fibers 20 (see FIGS. 1 and 2) of the second material 22 (see FIGS. 1 and 2) beyond those illustrated in FIG. 3.

A periodic distance between second fibers 20 of the second material 22 is a distance between a last of the second fiber bundles 66 in one of the second sections 36 and a first of the second fiber bundles 66 in a next, adjacent one of the second sections 36. For example, the distance between a last of the second fiber bundles $66_{31}$ positioned substantially along a right edge of a first one $36_1$ of the second sections 36 and a first of the second fiber bundles $66_{12}$ positioned substantially along a left edge of a second one $36_2$ of the second sections 36 is the periodic distance between the second fibers 20. For ease of illustration, only four (4) of the first fiber bundles 64 are illustrated in the first sections 34, and only three (3) of the second fiber bundles 66 are illustrated in the second sections 36.

In the illustrated embodiment, the periodic distance 40 between second fibers 20 of the second material 22 in the first direction D1 of the first ply 30 is greater than a predetermined distance. In one embodiment, the predetermined distance is about 9 mm. Similarly, with reference to FIG. 2, the periodic distance 42 between second fibers 20 of the second material 22 in the second direction D2 of the second ply 32 is greater than the predetermined distance (e.g., greater than about 9 mm).

With reference again to FIG. 3, it is contemplated that the periodic distance 40 between second fibers 20 of the second material 22 may also be determined based on a number of the first fiber bundles 64 of the first material 16 between adjacent ones of the second fiber bundles 66 of the second material 22. In one embodiment, as illustrated in FIG. 3, it is contemplated that there are at least one (1) of the first fiber bundles 64 of the first material 16 between adjacent ones of the second fiber bundles 66 of the second material 22. Similarly, with reference to FIG. 2, the periodic distance 42 between second fibers 20 (see FIG. 3) of the second material 22 (see FIG. 3) in the second direction D2 of the second ply 32 may also be determined based on a number of the first fiber bundles 64 (see FIG. 3) (e.g., at least one (1)) of the first material 16 between adjacent ones of the second fiber bundles 66 (see FIG. 3) of the second material 22.

FIG. 3 illustrates the periodic distance between second fibers 20 of the second material 22 in the first direction D1 of the first ply 30 is greater than 9 mm when there are at least a predetermined number of the first fiber bundles $64_{12}$ to $64_{42}$ of the first material 16 between adjacent ones of the second fiber bundles $66_{31}$ and $66_{12}$ of the second material 22. For example, it is contemplated that the predetermined number of the first fiber bundles $64_{12}$ to $64_{42}$ between adjacent ones of the second fiber bundles $66_{31}$ and $66_{12}$ is at least one (1).

Although FIG. 3 illustrates alternate sections 34, 36 of the first fibers 14 (see FIGS. 1 and 2) of the first material 16 and the second fibers 20 (see FIGS. 1 and 2) of the second material 22, other arrangements are also contemplated. For example, it is contemplated that there may be a plurality (e.g., two (2)) of adjacent sections of the first fibers 14 (see FIGS. 1 and 2) of the first material 16, and then a plurality (e.g., two (2)) of adjacent sections of the second fibers 20 (see FIGS. 1 and 2) of the second material 22. Such other arrangements are contemplated as long as there are a plurality of at least the predetermined number of first fiber bundles 64 of the first material 16 between any two (2) adjacent second fiber bundles 66 of the second material 22 and as long as the periodic distance between second fibers 20 (see FIGS. 1 and 2) of the second material 22 in the first and second directions D1, D2 is greater than the predetermined distance (e.g., about 9 mm).

Figure 4:
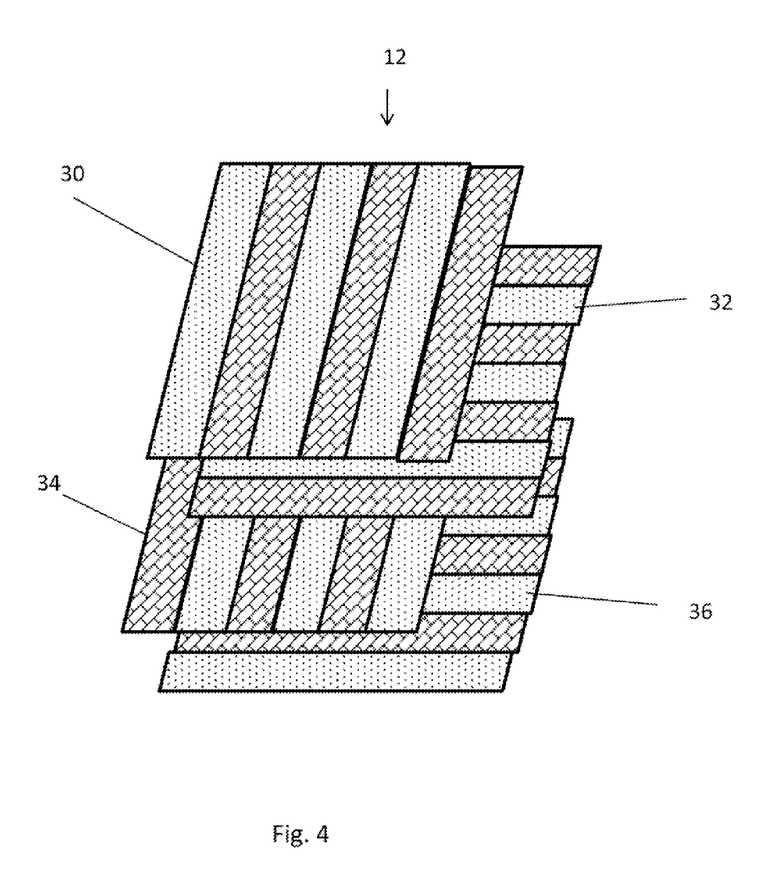
FIG. 4 illustrates a schematic representation of multiple plies of the laminate layer in accordance with one embodiment of an apparatus illustrating principles of the present invention.

With reference to FIG. 4, it is contemplated that the first layer 12 may also include additional plies. For example, the first layer 12 may include the first ply 30, the second ply 32, a third ply 34, and a fourth ply 36. The third ply 34 includes at least a portion of the first fibers 14 of the first material 16 and at least a portion of the second fibers 20 of the second material 22 in the first direction D1. The fourth ply 36 includes at least a portion of the first fibers 14 of the first material 16 and at least a portion of the second fibers 20 of the second material 22 in the second direction D2. The first ply 30 is adjacent to the second ply 32; the second ply 32 is adjacent to the third ply 34; and the third ply 34 is adjacent the fourth ply 36.

It is to be understood that additional layers are constructed similar to the first layer 12.

The layers include respective first layers 12, which have a periodic distance greater than about 9 mm between the second fibers 20 of the respective second material 22 oriented at both the first and second directions D1, D2, respectively, have been found to provide good ballistic performance while, at the same time, providing desirable flame resistant properties. Although it would be expected that increasing the amount of second fibers 20 of the second material 22, which are flame retardant, would increase the flame resistant properties of the layers, the opposite has been found to be true. However, when the first fibers of the first material are UHMWPE fibers, increasing the amount of second fibers 20 of the second material 22 would decrease ballistic resistance properties of the layers.

Experimentation was conducted on layers including alternate first fibers 14 of the first material 16 (i.e., UHMWPE in the experiment) and second fibers 20 of the second material 22 (i.e., aramid in the experiment). The alternate first fibers 14 of the first material 16 (UHMWPE) and second fibers 20 the second material 22 (aramid) did increase the flame resistant properties of the laminate layers, but offered relatively low ballistic performance compared to laminate layers including only first fibers 14 of the first material 16 (UHMWPE). The laminate layers described herein provide between about 90% and about 96% of the ballistic performance of the laminate layers including, only first fibers 14 of the first material 16 (UHMWPE), while also providing similar or the same level of flame resistant properties of the laminate layers including alternate first fibers 14 of the first material 16 (UHMWPE) and second fibers 20 of the second material 22 (aramid).

Flame resistance of a hard panel comprising multiple laminate layers was determined in accordance with FAR 25.853, Appendix F, Part I, 60 second vertical burn test standard. In the test, a testing specimen of 3"×12" is vertically mounted on a sample holder. A flame is then applied to the edge of bottom of the tested specimen for 60 seconds and then removed. The flammability requirements are as follows. Average burn length should be less than 6 inches; average flame time after removal of a flame should be less than 15 seconds; drippings may not continue to burn more than 3 seconds. In order to compare flammability of the tested hard panels made with laminate layers of different materials, the comparison should be conducted at the same thickness of the test specimen. As showed in Table 1 and Table 2, one of the hard panel made with laminate layers including only first fibers 14 of the first material 16 (UHMWPE), which is relatively more flammable, burned the entire length of a specimen of 3"×12" when exposed to a flame. The UHMWPE/aramid hybrid hard panel at the thickness of 0.10 inches made with laminate layers including alternate first fibers 14 of the first material 16 (UHMWPE) and second fibers 20 of the second material 22 (aramid) only burned about 2.5" of the 12" length when exposed to a flame. The hard panel at thickness of 0.10 inches made with laminate layers including only second fibers 20 of the second material 22 (aramid), which is relatively more flame resistant, burned about 1.5" to 2.0" of the 12" length of the panel when exposed to a flame. The UHMWPE/aramid hybrid hard panels at thickness of 0.10 inches made with laminate layers described above burned about 2.6" of the 12" length when exposed to a flame, which did burn more than the panels made with the laminate layers including only second fibers 20 of the second material 22 (aramid) and burnt the almost same length with the panels made with the laminate layers including alternate first fibers 14 of the first material 16 (UHMWPE) and second fibers 20 of the second material 22 (aramid).

TABLE 1

FAR 25.853 60 Sec. Vertical Burn Test Results: Pass/Fail

| Test Samples | Thickness | | |
|---|---|---|---|
| | 0.16" | 0.10" | 0.05" |
| UHMWPE (Benchmark A) | Fail | Fail | N/A |
| UHMWPE (Benchmark B) | Fail | Fail | N/A |
| UHMWPE/aramid hybrid (distance between aramid fibers > about 9 mm) | N/A | Pass | Pass |
| UHMWPE/LCP hybrid (distance between LCP fibers > about 9 mm) | N/A | Pass | Pass |
| UHMWPE/aramid alternate hybrid | N/A | Pass | Pass |
| Aramid (Benchmark C) | N/A | Pass | Pass |
| Aramid (Benchmark D) | Pass | Pass | Pass |

TABLE 2

FAR 25.853 60 Sec. Vertical Burn Test Data (Burning Time, Burning Length, and Largest Burning Particle Time)

| Results | Thickness (inches) | | | | | | | | |
|---|---|---|---|---|---|---|---|---|---|
| | 0.16" | | | 0.10" | | | 0.05" | | |
| | Burning Time (sec.) | Burning Length (inches) | Burning Particle (sec.) | Burning Time (sec.) | Burning length (inches) | Burning Particle (sec.) | Burning Time (sec.) | Burning Length (inches) | Burning Particle (sec.) |
| UHMWPE (Benchmark A) | 87 | 3.5 | None | 162 | 8.0 | 1 | N/A | N/A | N/A |
| UHMWPE (Benchmark B) | 420+ | 12 | 5 | 300+ | 12 | 3 | N/A | N/A | N/A |
| UHMWPE/aramid hybrid (distance between aramid fibers > about 9 mm) | N/A | N/A | N/A | 0 | 2.6 | None | 0 | 3.0 | None |
| UHMWPE/LCP hybrid (distance between LCP fibers > about 9 mm) | N/A | N/A | N/A | 0 | 1.6 | None | 0 | 2.4 | None |
| UHMWPE/aramid alternate hybrid | N/A | N/A | N/A | 0 | 2.5 | None | 0 | 3.5 | None |
| Aramid (Benchmark C) | N/A | N/A | N/A | 9 | 2.0 | None | 0 | 3.2 | None |
| Aramid (Benchmark D) | 0 | 1.9 | None | 1 | 1.5 | None | 0 | 3.6 | None |

The hard UHMWPE/aramid hybrid panels made with laminate layers at the thickness of 0.05" described above burned 3.0" of the 12" length when exposed to the flame, which burned less than both the panels made with the laminate layers including only second fibers 20 of the second material 22 (aramid) and the UHMWPE/aramid hybrid panels made with the laminate layers including alternate first fibers 14 of the first material 16 (UHMWPE) and second fibers 20 of the second material 22 (aramid). Compared to UHMWPE/aramid hybrid panels as described above, the UHMWPE/LCP hybrid panels made with the laminate layers that have a periodic distance greater than about 9 mm between the LCP (flame retardant) fibers showed the better flammability and ballistic performance. The additional ballistic performance offered by the laminate layers described above is desirable. Any material that burns less than about 6" of the 12" length when exposed to a flame is acceptable for its flame resistant properties per the FAR 25.853 60 seconds vertical burn test standard.

TABLE 3

.50 Caliber FSP V50 Ballistic Performance of Hard Panels at Areal Density of 5 Lbs/Feet$^2$

| Tested Panels | V50 (feet/sec.) |
|---|---|
| UHMWPE (Benchmark A) | 3294 |
| UHMWPE (Benchmark B) | 3111 |
| UHMWPE/aramid hybrid (distance between aramid fibers > about 9 mm) | 3163 |
| UHMWPE/LCP hybrid (distance between LCP fibers > about 9 mm) | 3216 |
| UHMWPE and aramid alternate hybrid | 2997 |
| Aramid (Benchmark C) | 2500 |
| Aramid (Benchmark D) | 2511 |

TABLE 4

M80 Ball V50 Ballistic Performance of Hard Panels on Clay at Areal Density of 3.5 Lbs/Feet$^2$

| Tested Panels | V50 (feet/sec.) |
|---|---|
| UHMWPE (Benchmark A) | 2878 |
| UHMWPE (Benchmark B) | 2740 |
| UHMWPE/aramid hybrid (distance between aramid fibers > about 9 mm) | 2597 |
| UHMWPE/LCP hybrid (distance between LCP fibers > about 9 mm) | 2754 |
| UHMWPE and aramid alternate hybrid | 2439 |
| Aramid (Benchmark C) | 2164 |

Figure 5:
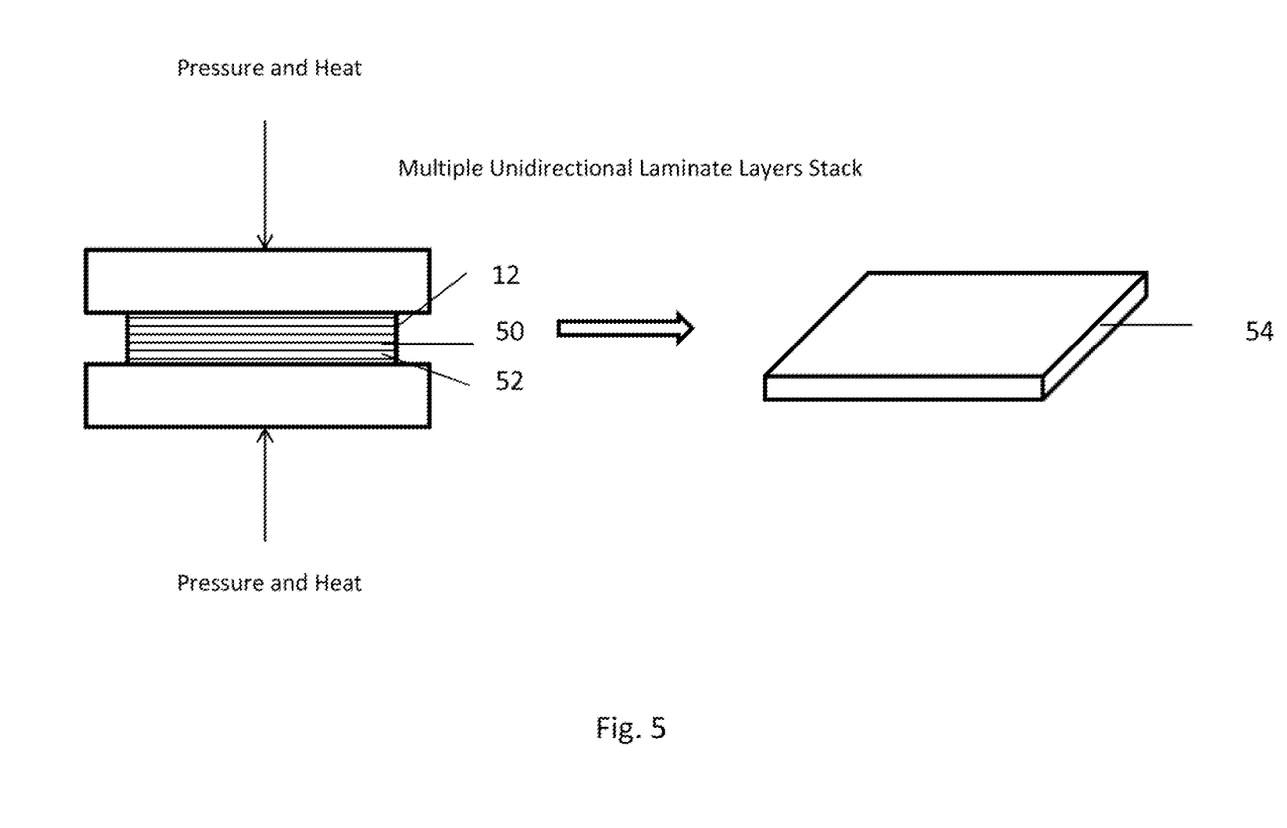
FIG. 5 illustrates a schematic representation of multiple laminate layers formed into a panel in accordance with one embodiment of an apparatus illustrating principles of the present invention.

With reference to FIG. 5, the first layer 12, a second layer 50 and, optionally, additional layers 52 are stacked and then pressed at pressure (14 to 10,000 psi, preferred range of pressure 1,000 to 3,000 psi) and heat (e.g., if the UHMWPE fiber is used as first material, temperature ranges from 210 to 285° F., preferred temperature ranges from 250-270° F.) to form a hard panel 54. It is contemplated that the hard panel 54 may be used in body armor, vehicle armor, and aircraft armor to provide ballistic protection in, for example, military and civilian applications. Although only a hard panel is described above, it is to be understood that soft panels may also be used in soft body armor, soft spall liner, and ballistic blanket applications.

With reference to FIGS. 1-4, the first layer 12 is formed by arranging the first fibers 14 of the first material 16 and the second fibers 20 of the second material 22 in the first direction D1 in a first ply 30 so that at least one (1) of the first fiber bundles 64 of the first material 16 are between two (2) adjacent fibers 20 of the second material 22. The first fibers 14 of the first material 16 and the second fibers 20 of the second material 22 are also arranged in the second direction D2 in a second ply 32 so that at least one (1) of the first fiber bundles 64 of the first material 16 are between two (2) adjacent fibers 20 of the second material 22. Optionally, additional plies are formed.

As discussed above, the periodic distance between the second fibers 20 of the second material 22 oriented at the first and second directions D1, D2, respectively, are greater than about 9 mm.

The first and second plies 30, 32 are positioned adjacent to one another, as discussed above, to form the first layer 12. Additional plies are optionally positioned adjacent each other to increase a thickness of the first layer 12.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A ballistic laminate comprising:
   a layer having a plurality of plies, including at least a first ply and a second ply immediately adjacent to the first ply, the first ply comprising:
   a first section containing first unidirectional fibers of a first material oriented at a first direction; and
   a second section containing second unidirectional fibers of a second material oriented at the first direction, the second section containing the second fibers of the second material is immediately adjacent to and alternates with the first section containing the first fibers of the first material, the first material is flammable and the second material is flame retardant;
   the second ply comprising:
   a first section containing the first unidirectional fibers of the first material oriented at a second direction; and
   a second section containing the second unidirectional fibers of the second material oriented at the second direction, the second section containing the second fibers of the second material is immediately adjacent to and alternates with the first section containing the first fibers of the first material;
   a periodic distance greater than about 9 mm between each second section of the second fibers of the second material oriented at the first direction; and
   a periodic distance greater than about 9 mm between each second section of the second fibers of the second material oriented at the second direction.

2. The ballistic laminate as set forth in claim 1, wherein: the first and second directions are perpendicular to each other.

3. The ballistic laminate as set forth in claim 1, wherein:
   the first fibers are at least one of ultra-high-molecular-weight-polyethylene (UHMWPE) fibers and polypropylene fibers in a matrix.

4. The ballistic laminate as set forth in claim 1, wherein:
the second fibers are at least one of aramid fibers, liquid crystal polymer (LCP) fibers, glass fibers, PBO fibers, carbon fibers, ceramic fibers, PTFE fluoropolymer fibers, and steel wires.

5. The ballistic laminate as set forth in claim 1, wherein the layer includes a third ply and a fourth ply:
the third ply includes first sections containing first unidirectional fibers of the first material immediately adjacent to and alternating with second sections containing second unidirectional fibers of the second material, the first fibers and the second fibers being oriented at the first direction; and
the fourth ply includes first sections containing first unidirectional fibers of the first material immediately adjacent to and alternating with second sections containing second unidirectional fibers of the second material, the first fibers and the second fibers being oriented at the second direction.

6. The ballistic laminate as set forth in claim 5, wherein:
the first ply is adjacent to the second ply;
the second ply is adjacent to the third ply; and
the third ply is adjacent to the fourth ply.

7. The ballistic laminate as set forth in claim 5, wherein:
the first direction is 0°; and
the second direction is 90° relative to the first direction.

8. The ballistic laminate as set forth in claim 1, wherein:
in each of the respective directions, there is at least one fiber bundle of the first fibers between adjacent fiber bundles of the second fibers.

9. The ballistic laminate as set forth in claim 1, wherein:
the first fibers of the first material have a Limiting Oxygen Index less than or equal to 25; and the second fibers of the second material have a Limiting Oxygen Index greater than 25.

10. A ballistic laminate, comprising:
a layer including:
a first section containing first unidirectional fibers, oriented at either a first direction or a second direction, being flammable with a Limiting Oxygen Index less than or equal to 25; and
a second section containing second unidirectional fibers, oriented at either the first direction or the second direction, being flame retardant with a Limiting Oxygen Index greater than 25; and
the first section containing first unidirectional fibers oriented at the first direction is immediately adjacent to the second section containing second unidirectional fibers oriented at the first direction, the first section containing first unidirectional fibers oriented at the second direction is immediately adjacent to the second section containing second unidirectional fibers oriented at the second direction.

11. The ballistic laminate as set forth in claim 10, wherein:
a periodic distance greater than about 9 mm is between each second section of the second fibers oriented at the first direction; and
a periodic distance greater than about 9 mm is between each second section of the second fibers oriented at the second direction.

12. The ballistic laminate as set forth in claim 11, wherein:
the section of the first unidirectional fibers is between any two adjacent sections of the second unidirectional fibers of the second material.

13. The ballistic laminate as set forth in claim 10, further including:
a second layer including:
a first section containing the first unidirectional fibers oriented at either the first direction or the second direction; and
a second section containing the second unidirectional fibers oriented at either the first direction or the second direction; and
the first section containing first unidirectional fibers oriented at the first direction is immediately adjacent to the second section containing second unidirectional fibers oriented at the first direction, the first section containing first unidirectional fibers oriented at the second direction is immediately adjacent to the second section containing second unidirectional fibers oriented at the second direction;
wherein the first and second layers are stacked together and heated to form a panel.

14. The ballistic laminate as set forth in claim 13 wherein each of the first layer and the second layer comprises a plurality of plies.

15. A ballistic laminate comprising:
a first layer having a plurality of plies, including at least a first ply and a second ply immediately adjacent to the first ply, the first and second plies comprising:
a plurality of first sections containing first unidirectional fibers of a flammable material with a Limiting Oxygen Index less than or equal to 25, the first unidirectional fibers in the first ply being oriented at a first direction and the first unidirectional fibers in the second ply being oriented at a second direction;
a plurality of second sections containing second unidirectional fibers of a flammable material with a Limiting Oxygen Index greater than 25, the second unidirectional fibers in the first ply being oriented at the first direction and the second unidirectional fibers in the second ply being oriented at the second direction;
each first section containing first unidirectional fibers oriented at the first direction is immediately adjacent to and alternates with a second section containing second unidirectional fibers oriented at the first direction, and each first section containing first unidirectional fibers oriented at the second direction is immediately adjacent to and alternates with a second section containing second unidirectional fibers oriented at the second direction;
a periodic distance greater than about 9 mm between each second section containing second unidirectional fibers oriented at the first direction; and
a periodic distance greater than about 9 mm between each second section containing second unidirectional fibers oriented at the second direction;
a second layer having a plurality of plies, including at least a first ply and a second ply immediately adjacent to the first ply, the first and second plies comprising:
a plurality of first sections containing first unidirectional fibers of a flammable material with a Limiting Oxygen Index less than or equal to 25, the first unidirectional fibers in the first ply being oriented at a first direction and the first unidirectional fibers in the second ply being oriented at a second direction;
a plurality of second sections containing second unidirectional fibers of a flammable material with a Limiting Oxygen Index greater than 25, the second unidirectional fibers in the first ply being oriented at the first direction and the second unidirectional fibers in the second ply being oriented at the second direction;
each first section containing first unidirectional fibers oriented at the first direction is immediately adjacent to and alternates with a second section containing second unidirectional fibers oriented at the first direction, and each first section containing first unidirectional fibers oriented in the second direction is immediately adjacent to and alternates with a second section containing second unidirectional fibers oriented at the second direction;

a periodic distance greater than about 9 mm between each second section containing second unidirectional fibers oriented at the first direction; and a periodic distance greater than about 9 mm between each second section containing second unidirectional fibers oriented at the second direction;

wherein the first and second layers are stacked together and heated to form a panel.

* * * * *